United States Patent
Ishikawa

(10) Patent No.: US 7,889,072 B2
(45) Date of Patent: Feb. 15, 2011

(54) FAILURE INFORMATION DETECTION DEVICE, FAILURE INFORMATION DETECTION SYSTEM, SERVER, AND FAILURE INFORMATION DETECTION METHOD

(75) Inventor: Tomoyasu Ishikawa, Nagoya (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 246 days.

(21) Appl. No.: 12/208,681

(22) Filed: Sep. 11, 2008

(65) Prior Publication Data

US 2009/0066494 A1     Mar. 12, 2009

(30) Foreign Application Priority Data

Sep. 11, 2007 (JP) .............................. 2007-235506

(51) Int. Cl.
G08B 1/08 (2006.01)
B60Q 1/00 (2006.01)
G06F 19/00 (2006.01)
G06F 11/30 (2006.01)
G01M 17/00 (2006.01)
G01R 31/00 (2006.01)

(52) U.S. Cl. .............. 340/539.24; 340/438; 340/435; 340/436; 700/95; 700/109; 701/29; 701/34; 702/58; 702/185

(58) Field of Classification Search ........... 340/539.24, 340/438, 435, 436; 700/95, 108, 109; 701/29–35, 701/300, 301; 702/57–59, 176, 179, 182–185
See application file for complete search history.

(56) References Cited

U.S. PATENT DOCUMENTS

2007/0126559 A1* 6/2007 Adachi .................... 340/425.5

FOREIGN PATENT DOCUMENTS

| JP | 06-055983 A | 3/1994 |
| JP | 2005-41438 A | 2/2005 |
| JP | 2006-008057 A | 1/2006 |
| JP | 2006-96325 A | 4/2006 |
| JP | 2006-264540 A | 10/2006 |
| JP | 2007-156949 A | 6/2007 |

* cited by examiner

Primary Examiner—Daniel Wu
Assistant Examiner—Mark Rushing
(74) Attorney, Agent, or Firm—Sughrue Mion, PLLC

(57) ABSTRACT

A failure information detection device that detects abnormality of a vehicle-mounted device that is mounted in a vehicle has: an attachment detection portion that detects whether a first component part has been attached to the vehicle; an abnormality detection portion that detects abnormality of a second component part that is disposed on the first component part; and an abnormality information discernment portion that discerns that abnormality information regarding the abnormality is not based on a failure of the vehicle-mounted device if the attachment detection portion detects that the first component part has not been attached to the vehicle.

13 Claims, 12 Drawing Sheets

FIG. 12

| CHASSIS NO. | ABNORMALITY CODE | DATE/TIME OF ABNORMALITY DETECTION | POSITION INFORMATION AT TIME OF ABNORMALITY DETECTION | ASSOCIATED INFORMATION |
|---|---|---|---|---|
| SX31-9000001 | X044 | 200x/10/10 12:34 | LATITUDE ××○○ LONGITUDE | VEHICLE SPEED 15km/h |
| MX31-1200023 | Y098 | 200x/11/15 13:45 | LATITUDE ×○○△ LONGITUDE | VEHICLE SPEED 50km/h |
| ·· | | ·· | ·· | ·· |

FAILURE INFORMATION DETECTION DEVICE, FAILURE INFORMATION DETECTION SYSTEM, SERVER, AND FAILURE INFORMATION DETECTION METHOD

INCORPORATION BY REFERENCE

The disclosure of Japanese Patent Application No. 2007-235506 filed on Sep. 11, 2007 including the specification, drawings and abstract is incorporated herein by reference in its entirety.

BACKGROUND OF THE INVENTION

1. Field of the Invention

The invention relates to a failure information detection device, a failure information detection system, a server, and a failure information detection method which are constructed to transmit abnormality information from a vehicle to an information center.

2. Description of the Related Art

Various vehicle-mounted devices mounted in a vehicle are controlled by electronic control units on the basis of signals detected by sensors or necessary information. In many cases, such an electronic control unit is equipped with a self-diagnosis function that diagnoses whether a vehicle-mounted device is operating normally. A result of the self-diagnosis is recorded in the vehicle, and is later used at a repair shop or the like in order to analyze the cause of abnormality or the like. In order to sooner collect information regarding occurrence of abnormality, there has been proposed a technology in which abnormality information regarding a vehicle is transmitted on the spot to an information center.

For example, Japanese Patent Application Publication No. 2006-96325 (JP-A-2006-96325) discloses a technology in which an information center collects abnormality information regarding a vehicle, and transmits the information to the automaker or the dealer, so that the automaker or the dealer may analyze the cause of the abnormality, or may utilize the information for development of products or the like.

However, if all the abnormality information is transmitted to the information center, the abnormality information generated in the case where the vehicle-mounted device actually has no fault, for example, in the case of replacement of a component part or the like which is undesirably detected as abnormality, is also transmitted to the information center.

FIG. 1 shows a general construction diagram of a failure information detection system according to the related art. A vehicle 110 is equipped with a clearance sonar device (vehicle-mounted device) that detects an obstacle present near the vehicle at the time of parking or the like, and that notifies a driver of the distance and the direction to the obstacle. The clearance sonar device has ultrasonic sensors 130 that are provided inside a bumper 140, and an electronic control unit 120 that detects signals from the ultrasonic sensors 130 is disposed on a vehicle body. Therefore, when the bumper 140 is replaced, the connection between an electronic control unit 120 and the ultrasonic sensors 130 is disconnected.

Since the electronic control unit 120 directly monitors the signals that the ultrasonic sensors 130 detect, the electronic control unit 120 detects an abnormality (a break or disconnection of line) of the clearance sonar device when the connection between the electronic control unit 120 and the ultrasonic sensors 130 is disconnected although there is no fault or the like with the ultrasonic sensors 130. Therefore, this abnormality information is transmitted to an information center 150.

The break of line in this case occurs only temporarily at the time of replacement of a component part, and is not caused by an abnormality of an ultrasonic sensor 130 or an actual breakage of a connecting line. However, at the information center 150, it may not be determined whether the abnormality indicated by abnormality information is a temporary situation, or a result of an actual fault of a device or the like. Therefore, the automaker or the dealer sometimes may not take an appropriate measure, such as analysis of the failure, procurement of component parts, etc., even though the automaker or the dealer has received abnormality information.

SUMMARY OF THE INVENTION

In view of the aforementioned problem, the invention provides a failure information detection device, a failure information detection system, a server and a failure information detection method which are capable of preventing false detection of abnormality of a vehicle-mounted device or preventing transmission of information based on the false detection of abnormality.

A failure information detection device in accordance with a first aspect of the invention is a failure information detection device that detects abnormality of a vehicle-mounted device, and includes: an attachment detection portion that detects whether a first component part has been attached to the vehicle; an abnormality detection portion that detects abnormality of a second component part that is disposed on the first component part; and an abnormality information discernment portion that discerns that the abnormality information is not based on a failure of the vehicle-mounted device if the attachment detection portion detects that the first component part has not been attached to the vehicle.

A failure information detection system in accordance with a second aspect of the invention is a failure information detection system that detects abnormality of a vehicle-mounted device, and includes: an attachment detection portion that is mounted in the vehicle and that detects whether a first component part has been attached to the vehicle; an abnormality detection portion that is mounted in the vehicle and that detects abnormality of a second component part that is disposed on the first component part; and a vehicle-side abnormality information discernment portion that is mounted in the vehicle and that discerns that the abnormality information is not based on a failure of the vehicle-mounted device, if the attachment detection portion detects that the first component part has not been attached to the vehicle.

A failure information detection method in accordance with a third aspect of the invention is a failure information detection method for a failure information detection device that detects abnormality of a vehicle-mounted device mounted in a vehicle and that transmits abnormality information to a server, and includes: detecting whether a first component part has been attached to the vehicle; detecting abnormality of a second component part that is disposed on the first component part; and discerning that the abnormality information is not based on a failure of the vehicle-mounted device, if it is detected that the first component part has not been attached to the vehicle.

Thus, it is possible to provide a failure information detection device, a failure information detection system, a server and a failure information detection method which are capable of preventing false detection of abnormality of a vehicle-mounted device or preventing transmission of information based on the false detection of abnormality.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 12 is a diagram showing an example of abnormality information that is displayed on a display in accordance with Example 4 in the embodiment of the invention.

DETAILED DESCRIPTION OF EMBODIMENTS

Figure 1:
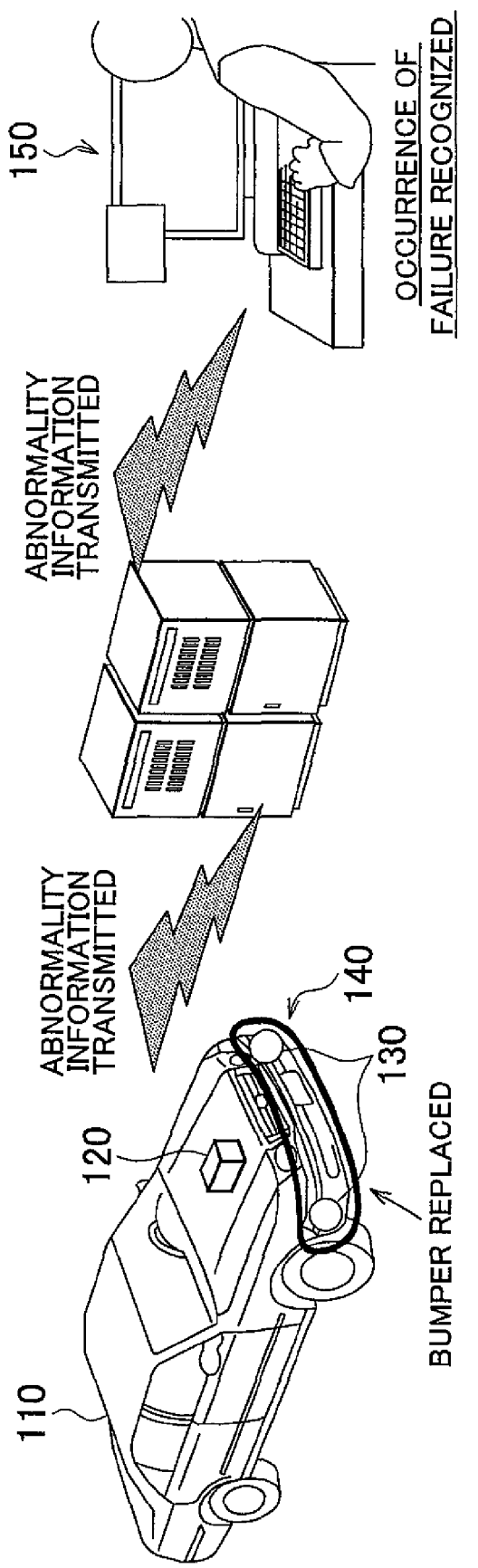
FIG. 1 is a general construction diagram of a failure information detection system in accordance with a related art of the invention.
Figure 2:
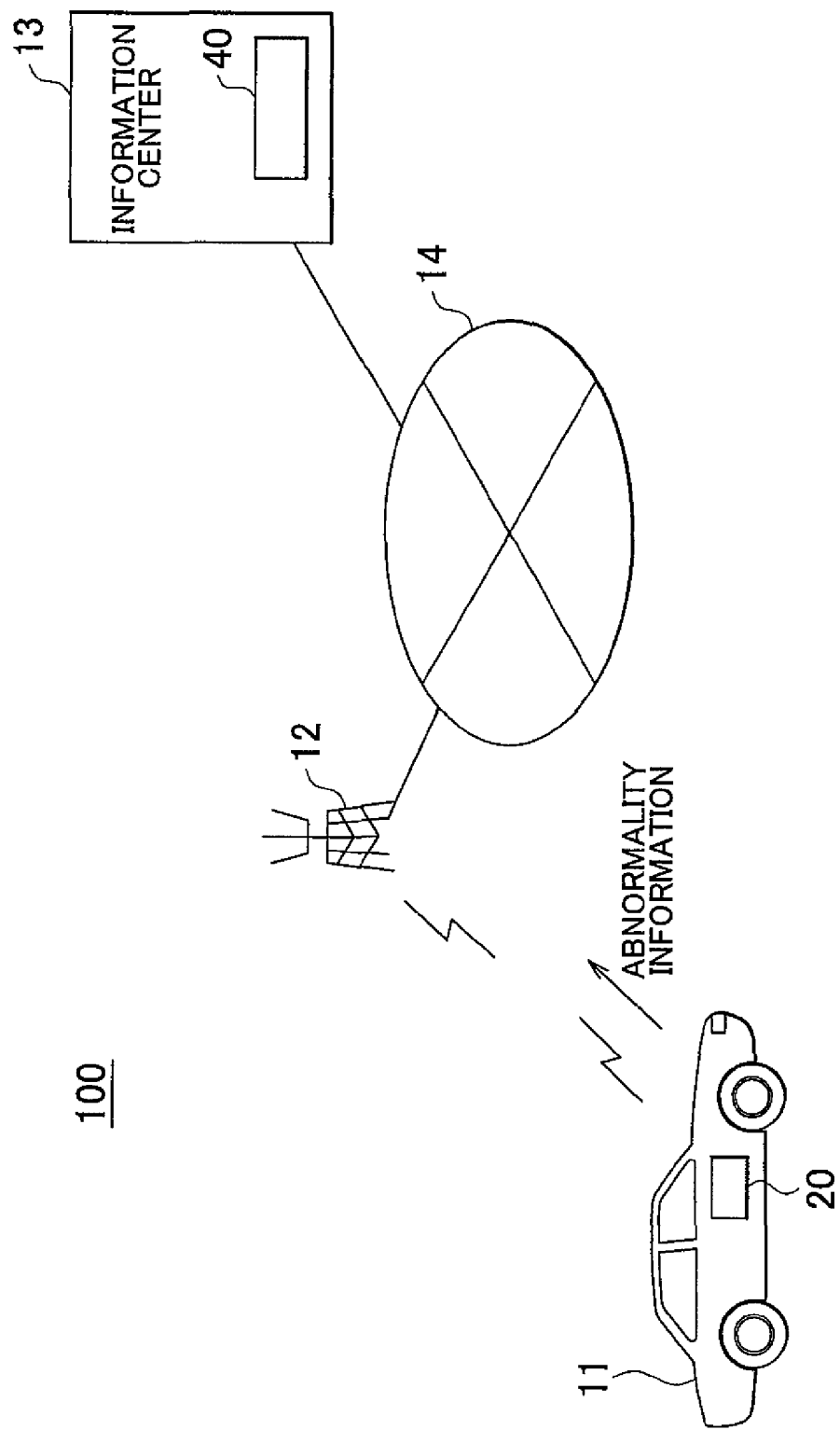
FIG. 2 is a general construction diagram of a failure information detection system that has a failure information detection device in accordance with an embodiment of the invention, and an information center.

Hereinafter, embodiments of the invention will be described with reference to the drawings. FIG. 2 shows a general construction diagram of a failure information detection system 100 that has an information center 13 and a failure information detection device 20 according to an embodiment of the invention.

The failure information detection system 100 of this embodiment prohibits the detection of an abnormality or prohibits the transmission of abnormality information to the information center 13 during the repair of a component part or the like, so that the information center 13 may receive only the abnormality information that is transmitted due to an actual failure, and therefore makes it possible to take an appropriate measure, such as analysis of the failure, procurement of component parts, or the like. Besides, the failure information detection system 100 of the embodiment determines whether the abnormality information from the information center 13 is abnormality information that has been generated due to repair of a component part, thereby making it possible for the information center 13 to take an appropriate measure such as failure analysis, procurement of a component part, or the like.

In the description below, it is defined that the occurrence of a failure refers to the case where an expected function may not be provided (the case where an expected function actually has a failure), and an abnormality refers to a fault that is detected by an electronic control unit (ECU) of a vehicle 11, regardless of whether there actually is a failure. Besides, a component part (a bumper 32 described below) that is to be an object of repair is referred to simply as a component part, and a component part disposed on another component part is referred to as a portion component part (an ultrasonic sensor 30 described below).

The vehicle 11 is equipped with the failure information detection device 20 that, if detecting an abnormality as a result of the self-diagnosis of various vehicle-mounted devices, collects abnormality information regarding the detected abnormality, and transmits the abnormality information to the information center 13.

The failure information detection device 20 is able to communicate with the information center 13 by connecting to a network 14 via, for example, a cell phone network base station 12, an access point of a wireless LAN, etc. Thus, the failure information detection device 20 transmits abnormality information to the information center 13. The abnormality information is transmitted by using a protocol, for example, the HTTP (Hyper Text Transfer Protocol), the FTP (File Transfer Protocol), etc. that are upper-compatible with the TCP (Transmission Control Protocol)/(Internet Protocol), or the like.

The information center 13 has a server 40 that is one form of a computer. The server 40 stores the abnormality information received by the information center 13, and performs analysis regarding a failed component part or a cause of a failure on the basis of the abnormality information. If it turns out that a failure has occurred, a replacement component part (spare part) is procured, or a service person is sent to the vehicle 11. The information center 13 may also transmit the abnormality information to the automaker.

With reference to an actual vehicle-mounted device as an example, description will be made below regarding the failure information detection device 20 that prohibits the detection of abnormality or the transmission of abnormality information to the information center 13 if there is no failure in the vehicle-mounted device.

Figure 3:
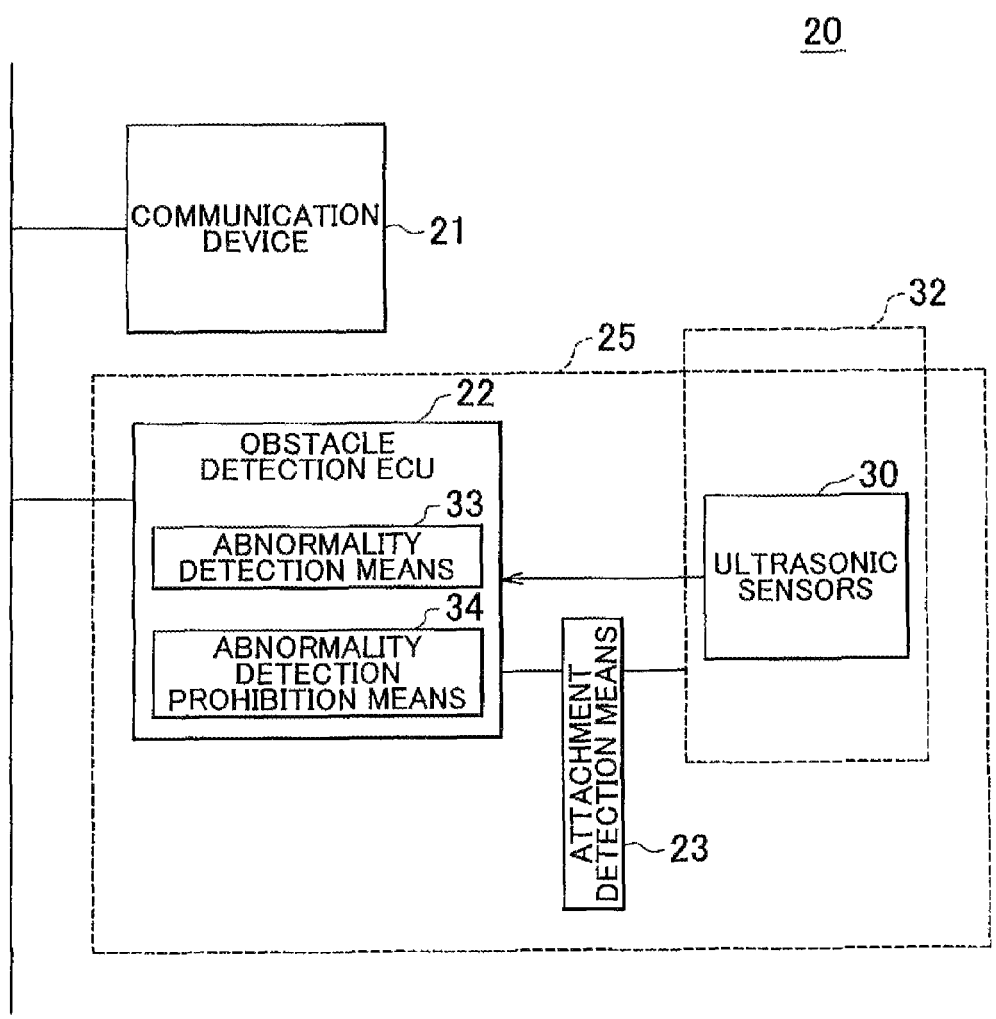
FIG. 3 is a general construction diagram of a failure information detection device in accordance with the embodiment of the invention.
Figure 4:
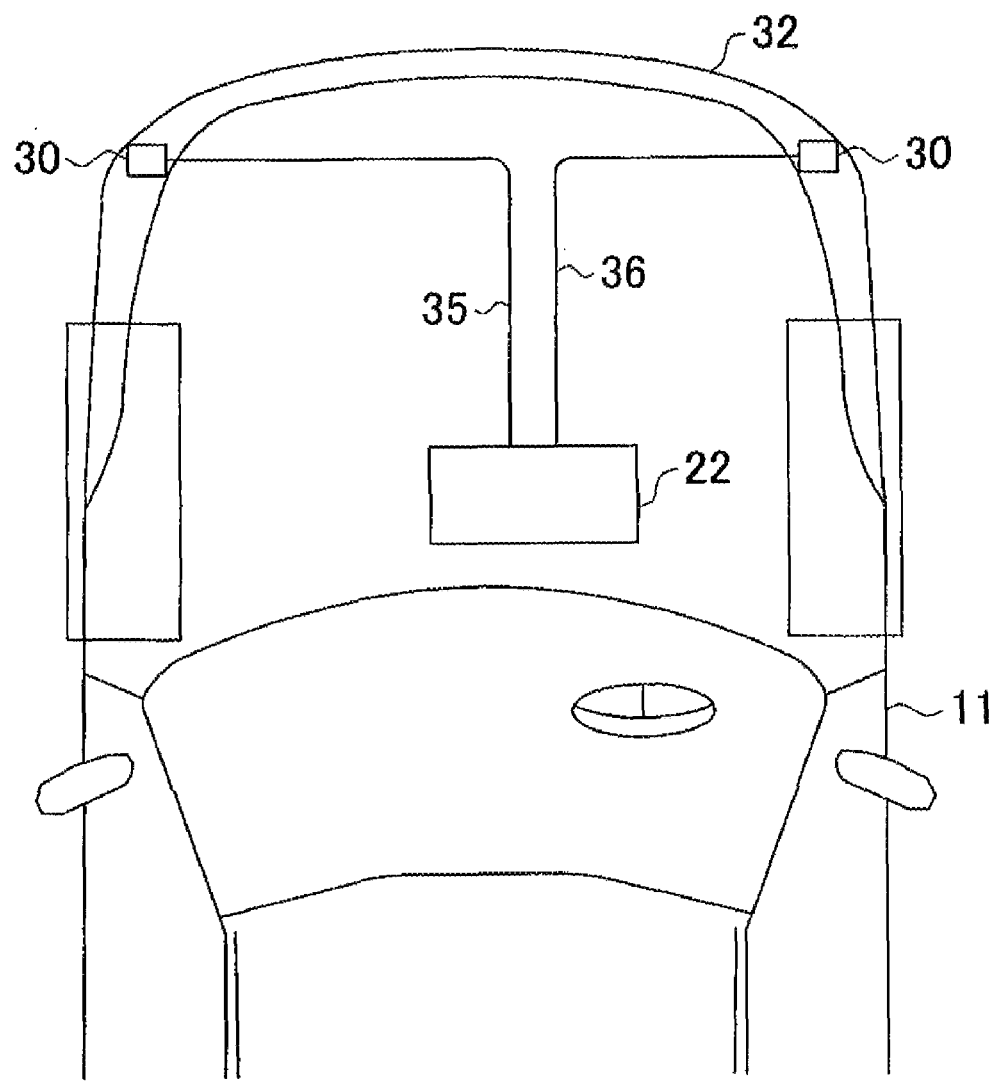
FIG. 4 is a general plan view of a vehicle equipped with a clearance sonar device in accordance with an embodiment of the invention.

FIG. 3 is a general construction diagram of the failure information detection device 20 in accordance with this embodiment. FIG. 4 shows a general plan view of the vehicle 11 equipped with a clearance sonar device 25 in accordance with the embodiment. The failure information detection device 20 has a construction in which a communication device 21 that connects to the base station 12, and the clearance sonar device 25 are connected to a bus, and the individual units perform time-division multiplex communication using the CAN (Controller Area Network) protocol, the LIN (Local Interconnect Network) protocol, etc.

The communication device 21, besides connecting to the base station 12, decomposes the abnormality information into predetermined packets, and transmits the packets with their packet numbers and the IP address of the information center 13. Incidentally, the communication device 21 in accordance with the embodiment may be regarded as a "transmission portion" in the invention.

The clearance sonar device 25 has an ultrasonic sensor 30, and an obstacle detection ECU 22 that detects the distance to an obstacle on the basis of the distance information detected by the ultrasonic sensor 30. The clearance sonar device 25 informs the driver of the existence of an obstacle at a location that is likely to be a blind spot for the driver or of the distance to the obstacle.

As shown in FIG. 4, each ultrasonic sensor 30 is disposed, for example, on an inner side of a bumper 32 so that an ultrasonic transmitter/receiver portion is disposed in a hole portion that is formed in a bumper cover of the bumper 32. Specifically, two ultrasonic sensors 30 are disposed in the left and right-side corner portions of a front bumper 32, and one ultrasonic sensor 30 is disposed in a central portion of a rear bumper 32 in the direction of vehicle width between the left and right-side corner portions. That is, a total of three ultrasonic sensors 30 are disposed on the front and rear bumpers 32. However, for the sake of simple description, the following description will normally be made in conjunction with only the front bumper 32 (referred to simply as "the bumper 32"), with description related to the rear bumper 32 being omitted.

Each ultrasonic sensor 30 has a detection range of, for example, about 50 cm to 100 cm, from the corresponding bumper 32, and sends ultrasonic waves of, for example, about 40 kHz, and sends out a signal that corresponds to the amount of time that it takes for the sent-out ultrasonic waves to be received by the ultrasonic sensor 30 after being reflected by an obstacle, to the obstacle detection ECU 22 via a signal line 35 or 36.

The obstacle detection ECU 22 detects the presence/absence of an obstacle that relatively approaches the vehicle 11 on the basis of the signals from the ultrasonic sensors 30. If an obstacle exists, the obstacle detection ECU 22 detects the distance from the vehicle 11 to the obstacle. The obstacle detection ECU 22 does not need to be disposed on the bumper 32, but needs to avoid the influence of external disturbance since the obstacle detection ECU 22 has a computation device such as a CPU and the like. Therefore, the obstacle detection ECU 22 is disposed inside the vehicle (e.g., in an instrument panel).

The obstacle detection ECU 22 is connected to a warning buzzer and to a display device of an instrument panel. If an obstacle exists within a predetermined distance, the obstacle detection ECU 22 alerts a driver of the vehicle by producing a warning sound, or flickering the display portion on and off, or the like. The obstacle detection ECU 22 outputs a warning of the existence of an obstacle aurally to the vehicle driver, and notifies the driver of the degree of emergency by changing the warning pattern (e.g., the time intervals of the buzzer, the pitch of the sound, etc.) according to the distance to the obstacle. Besides, the display device is used to visually inform the vehicle driver of the distance and direction to the obstacle by changing the display pattern (e.g., the display position, the display region, the display color, etc.) according to the ultrasonic sensor 30 of the plurality of ultrasonic sensors 30 that has detected the obstacle. In addition, the position of the obstacle relative to the vehicle 11 may also be output in the form of voice guidance.

The obstacle detection ECU 22 is a computer in which a CPU that executes programs, a RAM that serves a work area for executing programs and that temporarily stores data, a ROM that stores set conditions, parameters, etc., a non-volatile memory that stores programs, files, etc., and an input/output portion that inputs/outputs data are interconnected by internal buses.

The obstacle detection ECU 22 has abnormality detection means 33 for detecting an abnormality of the obstacle detection ECU 22 itself and of the ultrasonic sensors 30 by the CPU executing programs, and also has abnormality detection prohibition means 34.

The abnormality detection means 33 determines whether there is any abnormality, for example, no response, a break of line, a detection value abnormality (deviation from an expectable detection range), etc., periodically or at the time of use of the ultrasonic sensors 30. If an abnormality is detected, the abnormality detection means 33 generates abnormality information. The abnormality information includes discrimination information of the vehicle 11, an abnormality code for identifying an abnormality, such as the content of an abnormality and the like, is provided, for example, in a format as follows. Incidentally, the abnormality detection means 33 in accordance with the embodiment may be regarded as an "abnormality detection portion" in the invention.

"chassis number—abnormality code—data and time of abnormality detection—information about position at time of abnormality detection—associated information"

The associated information in the example format is information suitable for identifying the cause of abnormality information, such as the vehicle speed, the air temperature, the weather, the activation of the airbag device, etc., and is set by the obstacle detection ECU 22 according to the situation.

Furthermore, the failure information detection device 20 in this embodiment has attachment detection means 23 for detecting whether the bumper 32 has been attached to the vehicle body. The attachment detection means 23 will be described in detail in conjunction with further examples below. Briefly, the attachment detection means 23 detects that either the bumper 32 has been detached from the vehicle body on the basis of, for example, the detection of a break of line, the on/off of a switch, simultaneous occurrences of abnormality in the systems of the two signal lines 35, 36, etc. In addition, the attachment detection means 23 in accordance with the embodiment may be regarded as "attachment detection portion" in the invention.

When the attachment detection means 23 detects the detachment of the bumper 32, the abnormality detection prohibition means 34 prohibits abnormality detection means 33 from detecting abnormality, or prohibits the transmission of abnormality information to the information center 13 if abnormality is detected. The detection of abnormality itself may be prohibited, or the transmission of abnormality information to the information center 13 may be prohibited if abnormality is detected. Although either one of the prohibitions is possible, the prohibition of detection of abnormality itself facilitates the construction of the prohibition since the prohibition of detection of abnormality may be achieved merely by masking the detection of abnormality itself If the process up to detection of abnormality is permitted and the transmission of abnormality information is prohibited, the content of the abnormality may be recorded, thus allowing the later analysis of the abnormality. Incidentally, the abnormality detection prohibition means 34 in accordance with the embodiment may be regarded as an "abnormality detection prohibition portion" or an "abnormality information transmission prohibition portion". Besides, the obstacle detection ECU 22, which causes the execution of the abnormality detection prohibition means 34 upon detection of detachment of the bumper 32, may be regarded as an "abnormality information discernment portion" that is mounted in a vehicle in the invention.

Since the ultrasonic sensors 30 are fixed to the inner side of the bumper 32, it is necessary to temporarily disconnect the electrical connection between the ultrasonic sensors 30 and the obstacle detection ECU 22 when the bumper 32 is to be replaced for a reason, for example, that the bumper 32 has been damaged (but each of the ultrasonic sensors 30 has not failed). In the case where the ultrasonic sensors 30 and the obstacle detection ECU 22 are wirelessly interconnected, the connection therebetween is also disconnected as well since the distance between the bumper 32 and the vehicle 11 increases.

As a result, the abnormality detection means 33 of the obstacle detection ECU 22 detects abnormality of the ultrasonic sensors 30 at the time of a repairing operation of the bumper 32. Since the detected abnormality is not a failure of the clearance sonar device 25, it is not preferred to generate abnormality information from the detected abnormality and transmit the information as abnormality information to the information center 13.

In this embodiment, the replacement or detachment (hereinafter, referred to simply as "repair") of the bumper 32 is detected in order to prevent the abnormality information that is not based on a failure of a vehicle-mounted device from being transmitted to the information center 13. Hereinafter, various examples will be described.

In Example 1, the attachment detection means 23 detects detachment of the bumper 32, from a break of a connecting line 37 provided between the bumper 32 and the obstacle detection ECU 22.

Figure 5:
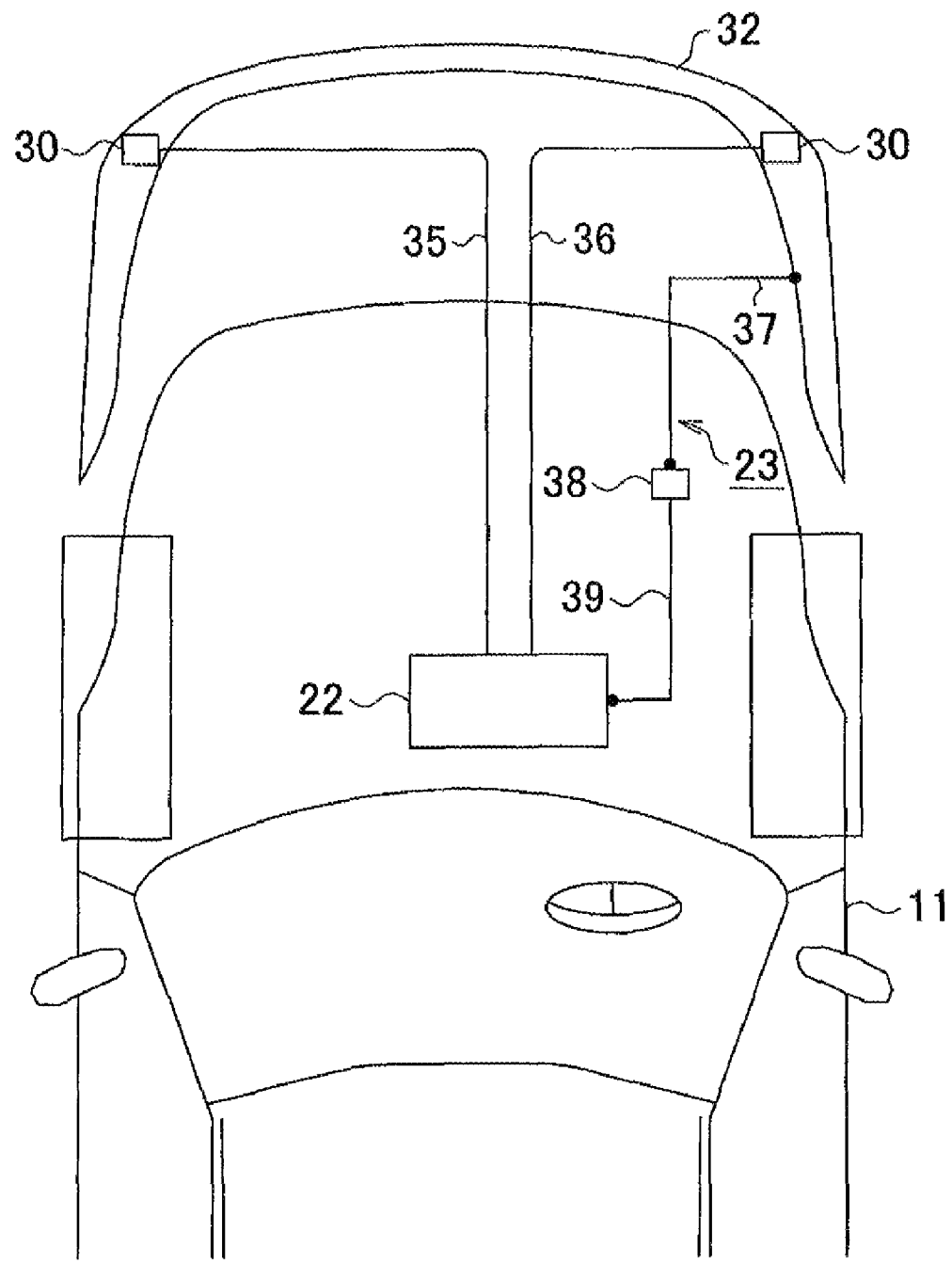
FIG. 5 is a general construction diagram of connecting line detection means in accordance with Example 1 of the embodiment of the invention.
Figure 6:
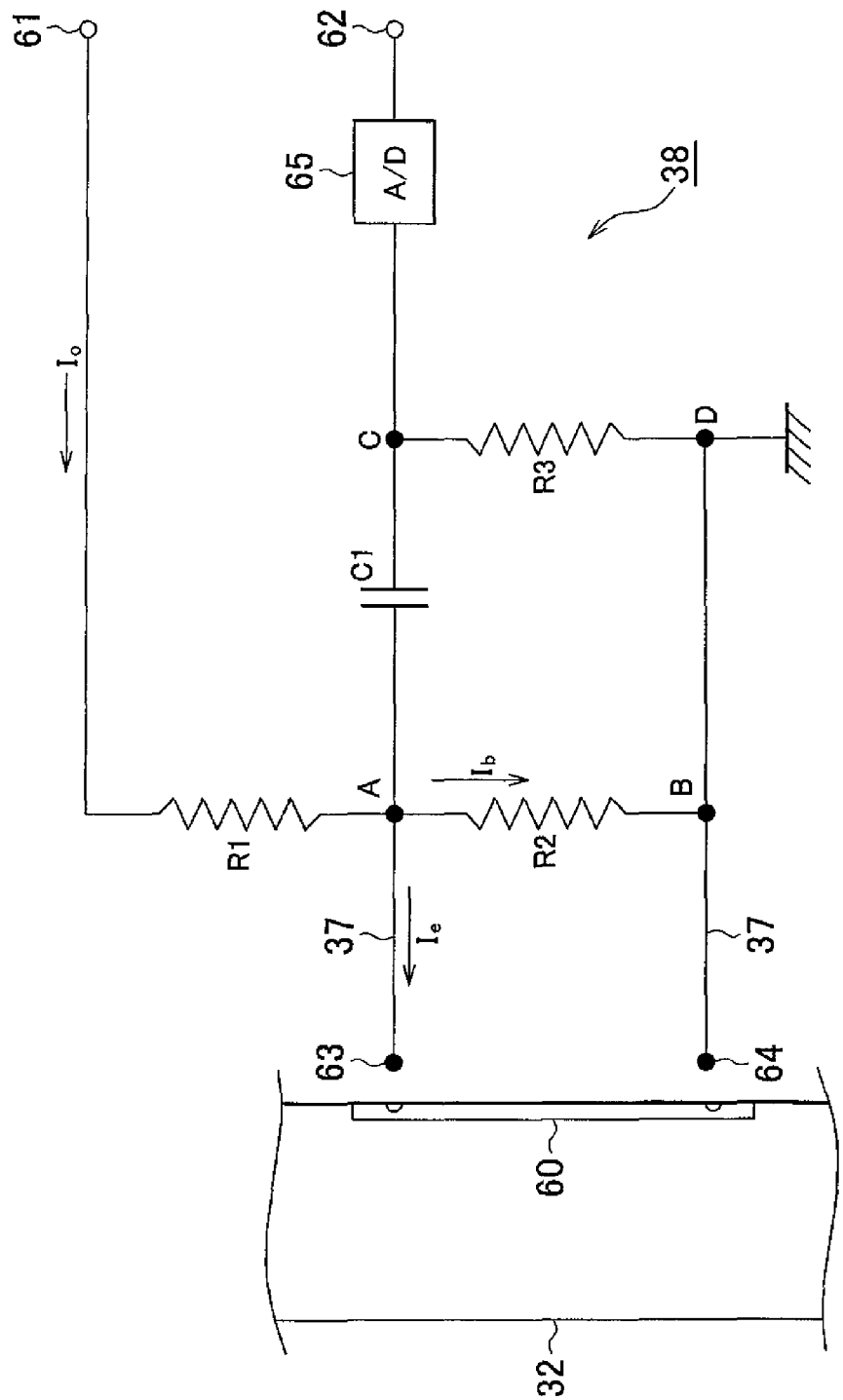
FIG. 6 is an example of a circuit diagram that detects a break of line in accordance with Example 1 of the embodiment of the invention.

FIG. 5 shows a general construction diagram of the attachment detection means 23 in Example 1. FIG. 6 shows an example of a circuit diagram that detects a break of line in Example 1. The attachment detection means 23 in Example 1 has connecting lines 37, 39 that electrically connect the bumper 32 and the obstacle detection ECU 22, and a break-of-line detection circuit 38 that detects a break of the connecting line 37. Incidentally, the break-of-line detection circuit 38 in accordance with the embodiment may be regarded as a "break-of-line detection portion".

The break-of-line detection circuit 38 will be described. Firstly, a state in which the bumper 32 is attached to the vehicle 11 will be described. The bumper 32 has, on its vehicle body side, a copper plate 60 that has a pair or recesses. Two connecting terminals 63, 64 of the break-of-line detection circuit 38 are connected to the two recesses of the copper plate 60, for example, by elastic members urging the terminals 63, 64 to the copper plate 60.

A resistance R2 is connected in parallel with the copper plate 60, and an end of a resistance R3 is connected to an end "B" of the resistance R2. A capacitor C1 is connected between the two resistances R2, R3. An end of the resistance R1 is connected to a connecting point "A" between the capacitor C1 and the resistance R2, and the other end of the resistance R1 is connected to the obstacle detection ECU 22 via an output terminal 61. An end of the capacitor C1 is connected to an AID converter 65. An end of the A/D converter 65 is connected to the obstacle detection ECU 22 via an input terminal 62.

When the obstacle detection ECU 22 outputs a current $I_O$ from the output terminal 61, the current $I_O$ divides, at the connecting point "A", into a current Ie that flows into the copper plate 60, and a current Ib that flows into the resistance R2. Therefore, if it is assumed that the resistance of the copper plate 60 including the connecting line 37 is Re, the voltage $V_{AB}$ between the connecting points "A", "B" is determined according to the values of the resistance Re, the resistance R2 and the resistance R3.

When the bumper 32 is detached so that the connection between the connecting terminals 63, 64 is disconnected, the resistance Re becomes infinitely great. As a result, the voltage $V_{AB}$ sharply rises. This change in the voltage $V_{AB}$ is differentiated at the capacitor C1, and is extracted as a change in the voltage $V_{CD}$ between connecting points C, D at both sides of the resistance R3. The waveform of the change exhibits a peak due to a differentiating circuit, the peak value is greater in the case the bumper 32 has been detached provided that the current $I_O$ is fixed at a single value.

If the value of the resistance R2 is appropriately set, the degree of the peak value at the time of a break of line is also determined. Since the value of the voltage $V_{CD}$ is input to the obstacle detection ECU 22 from the A/D converter 65, the detachment of the bumper 32 may be detected by the obstacle detection ECU 22 monitoring the voltage $V_{CD}$.

Figure 7A:
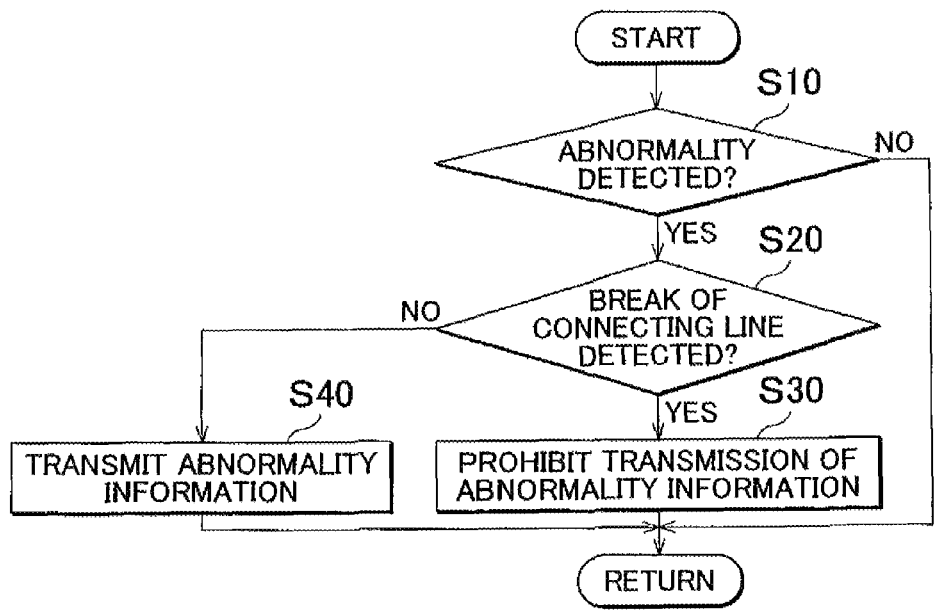
FIG. 7A is a flowchart of a procedure of abnormality detection prohibition means prohibiting the transmission of abnormality information when a break of a connecting line has been detected in Example I of the embodiment of the invention.
Figure 7B:
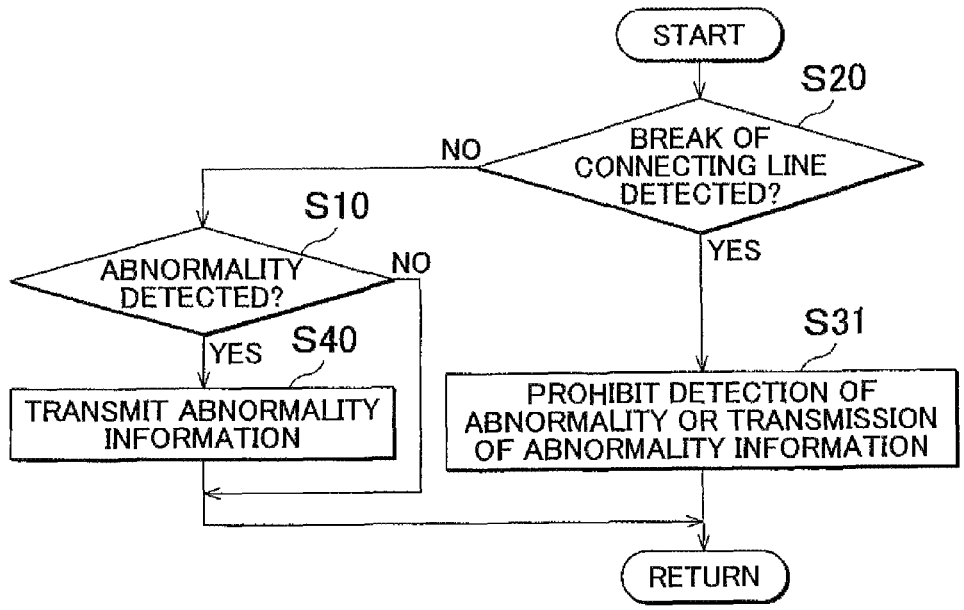
FIG. 7B is a flowchart of a procedure of abnormality detection prohibition means prohibiting the detection of abnormality or the transmission of abnormality information when a break of the connecting line has been detected in Example 1 of the embodiment of the invention.

FIG. 7A shows a flowchart of a procedure of the abnormality detection prohibition means 34 prohibiting the transmission of abnormality information if a break of the connecting line 37 in Example 1 is detected. FIG. 7B shows a flowchart of a procedure of prohibiting the detection of abnormality or the transmission of abnormality information if a break of the connecting line 37 is detected. The processes shown in the flowcharts of FIGS. 7A and 7B start, for example, upon the turning-on of an ignition switch.

The abnormality detection means 33 determines whether abnormality is detected at every predetermined cycle time (S10). If abnormality is not detected (NO in S10), the process of FIG. 7A ends. Thus, the determination in step S10 is repeatedly performed at every cycle time as long as abnormality is not detected. Incidentally, the process of FIG. 7A may be executed only when abnormality is detected.

If abnormality is detected (YES in S10), the abnormality detection prohibition means 34 detects the input voltage from the break-of-line detection circuit 38, and determines whether the connecting line 37 has a break (S20).

If the connecting line 37 does not have a break (NO in S20), the abnormality detection means 33 generates abnormality information regarding the abnormality detected in step S10, and transmits the abnormality information to the information center 13 (S40).

If the connecting line 37 has a break (YES in S20), the abnormality detection prohibition means 34 prohibits the transmission of abnormality information (S30).

Therefore, in the case where the connecting line 37 has a break due to repair of the bumper 32, the abnormality information is not transmitted to the information center 13. Thus, it is possible to prevent the event where the information center 13 detects abnormality information when there is no failure of a device or the like.

In FIG. 7B, it is determined whether a break of the connecting line 37 has been detected (S20). If such a break has been detected (YES in S20), the abnormality detection prohibition means 34 prohibits the detection of abnormality or the transmission of abnormality information (S31).

If a break of the connecting line 37 has not occurred (NO in S20) but abnormality has been detected (YES in S10), the abnormality detection means 33 transmits abnormality information to the information center 13 (S40).

Therefore, as in FIG. 7A, it is possible to prevent the event where the information center 13 detects abnormality information when there is no failure.

In Example 2, the attachment detection means 23 detects the detachment of the bumper 32 from state of a switch 76 that the bumper 32 drives.

Figure 8:
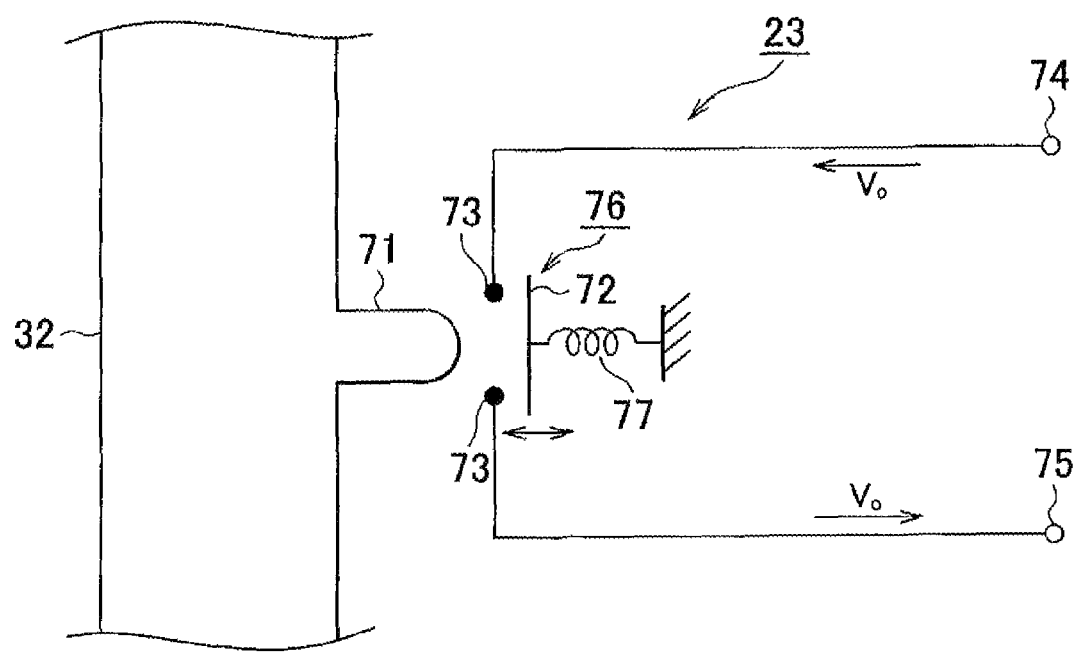
FIG. 8 is an example of a circuit diagram that detects the driving of a switch in accordance with Example 2 of the embodiment of the invention.

FIG. 8 shows an example of a circuit diagram that detects the driving of a switch in Example 2. The attachment detection means 23 in Example 2 has a protrusion 71 provided on the bumper 32, and a switch 76 that opens and closes a closed circuit that is connected to the obstacle detection ECU 22.

The protrusion 71 is protruded several millimeters to several centimeters from the bumper 32 toward the vehicle body side. A movable portion 72 of the switch 76 is urged in the direction of the protrusion 71 by an elastic body 77. An end terminal 74 of the closed circuit is connected to an output terminal of the obstacle detection ECU 22, and the other end terminal 75 is connected to an input terminal of the obstacle detection ECU 22.

Therefore, during the state in which the bumper 32 is attached to the vehicle 11, the movable portion 72 is pushed toward the interior of the vehicle body by the protrusion 71 so that the movable portion 72 and a pair of terminals 73 are in a non-contact state (switch-off state). Then, during the state in which the bumper 32 has been detached from the vehicle 11, the elastic body 77 urges the movable portion 72 so that the movable portion 72 and the two terminals 73 enter a contact state (switch-on state).

During the switch-on state, if the obstacle detection ECU 22 outputs a Hi signal (voltage Vo) to the terminal 74, the Hi signal (voltage Vo) is immediately output from the terminal 75, whereby the obstacle detection ECU 22 may detect that the bumper 32 has been detached.

Incidentally, the switch 76 may also be a switch that turns on when attached to the bumper 32.

Figure 9:
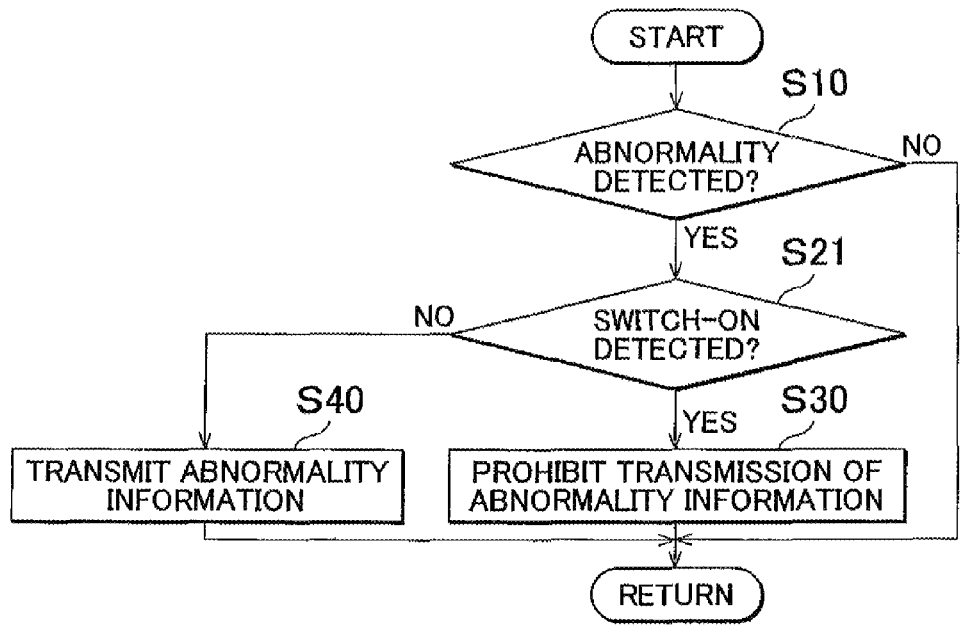
FIG. 9 is a flowchart of a procedure of the abnormality detection prohibition means prohibiting the transmission of abnormality information when the switch has been driven to an on-state in Example 2 of the embodiment of the invention.

FIG. 9 shows a flowchart of a procedure of the abnormality detection prohibition means 34 prohibiting the detection of abnormality or the transmission of abnormality information when the switch 76 in Example 2 is driven to the on-state. Incidentally, the procedure of prohibiting the detection of abnormality when the on-state of the switch 76 has been detected will be omitted from the description below. The process shown by the flowchart of FIG. 9 starts, for example, upon the truing-on of the ignition switch.

The abnormality detection means 33 determines whether abnormality has been detected at every predetermined cycle time (S10). If no abnormality has been detected (NO in S10), the process of FIG. 9 ends. Thus, the determination in step S10 is repeatedly executed as long as abnormality is not detected. Incidentally, the process of FIG. 9 may also be executed only when abnormality has been detected.

If abnormality is detected (YES in S10), the abnormality detection prohibition means 34 determines whether the switch 76 is in the on-state (S21).

If the switch 76 is not on (NO in S21), the abnormality detection means 33 generates abnormality information regarding the abnormality detected in step S10, and transmits the abnormality information to the information center 13 (S40).

If the switch 76 is on (YES in S21), the abnormality detection prohibition means 34 prohibits the transmission of abnormality information (S30).

Therefore, since abnormality information is not transmitted to the information center 13 if the switch 76 is turned on due to repair of the bumper 32, it is possible to prevent the event where the information center 13 detects abnormality information when there is no failure.

In Example 3, the detachment of the bumper 32 is detected by utilizing a break of signal lines 35, 36 that link the obstacle detection ECU 22 and the ultrasonic sensors 30. The construction of the failure information detection device 20 is substantially the same as that shown in FIG. 4. Therefore, in Example 3, the signal lines 35, 36 correspond to the attachment detection means 23.

The signal lines 35, 36 are signal lines for outputting to the obstacle detection ECU 22 a signal that corresponds to the amount of time that it takes for the ultrasonic waves sent out by an ultrasonic sensor 30 to be received by the ultrasonic sensor 30 after being reflected by an obstacle.

In the case where the bumper 32 is repaired, the connection of the signal lines 35, 36 is disconnected, so that the abnormality detection means 33 detects abnormality although no failure has occurred. However, in the case where a failure actually occurs to the signal lines 35, 36, it is rare that the two signal lines 35, 36 are both broken simultaneously. Specifically, in the case where the two signal lines 35, 36 are simultaneously broken or disconnected, it may be determined that the bumper 32 is being repaired, and therefore it is better not to transmit abnormality information to the information center 13.

The abnormality detection prohibition means 34 in Example 3 prohibits the transmission of abnormality information in the case where within a predetermined time following the detection of abnormality in the system of one of the signal line 35 and the signal line 36, abnormality is detected in the system of the other one of the signal line 35 and the signal line 36. In addition, in the case where three or more ultrasonic sensors 30 in total are disposed, the transmission of abnormality information is prohibited when abnormality is detected in each of the systems of the signal lines.

Figure 10:
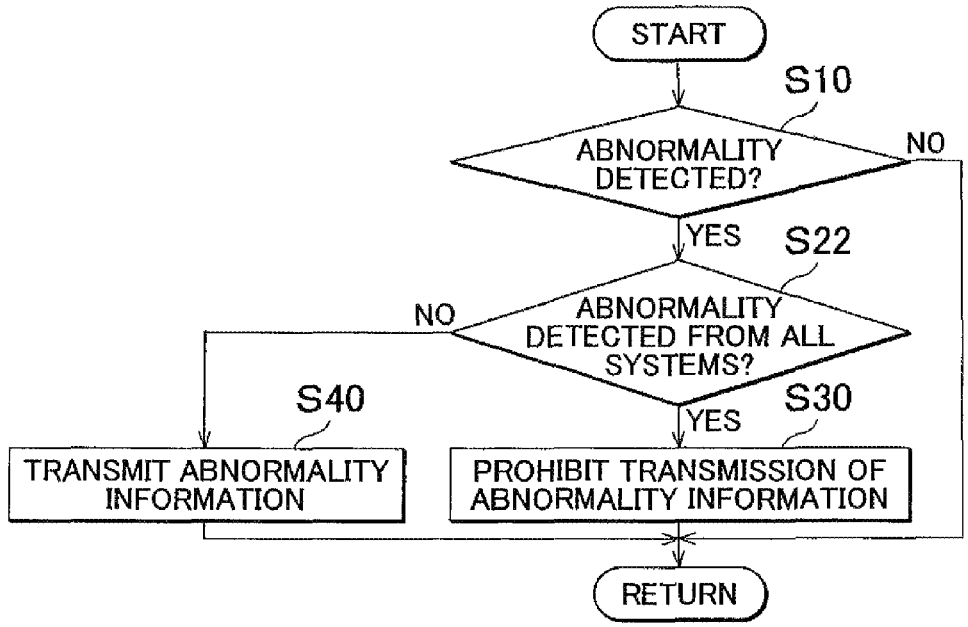
FIG. 10 is a flowchart of a procedure of the abnormality detection prohibition means prohibiting the transmission of abnormality information when abnormalities are detected substantially simultaneously in all the systems of signal lines in Example 3 of the embodiment of the invention.

FIG. 10 shows a flowchart of a procedure of prohibiting the abnormality detection prohibition means 34 from transmitting abnormality information in the case where abnormalities are detected substantially simultaneously in all the systems of the signal lines 35, 36. The process shown by the flowchart of FIG. 10 starts, for example, upon the turning-on of the ignition switch.

Incidentally, in Example 3, since the transmission of abnormality is prohibited provided that abnormalities occur in both the signal lines 35, 36, a processing procedure of prohibiting the detection of abnormality is not provided.

The abnormality detection means 33 determines whether an abnormality has been detected every predetermined cycle time (S10). If no abnormality has been detected (NO in S10), the process of FIG. 10 ends. The determination in step S10 is repeatedly executed as long as no abnormality is detected. Incidentally, the process shown in FIG. 10 may be executed only when abnormality is detected.

If abnormality is detected (YES in S10), the abnormality detection prohibition means 34 determines whether abnormality is detected in each of the signal lines 35, 36 (S22). For example, in the case where within a predetermined time (e.g., several minutes) following the detection of abnormality in the system of, for example, the signal line 35, abnormality in the system of the other signal line 36 is detected, it is determined that abnormality has been detected in all the systems of the signal lines 35, 36.

In the case where abnormality has not been detected in all the systems of the signal lines 35, 36 (NO in S22), the abnormality detection means 33 generates abnormality information regarding the abnormality detected in the step S10, and transmits the abnormality information to the information center 13 (S40).

If abnormality has been detected in all the systems of the signal lines 35, 36 (YES in S22), the abnormality detection prohibition means 34 prohibits the transmission of abnormality information (S30).

Therefore, in the case where the bumper 32 has been detached and abnormality has been detected in all the systems of the signal lines 35, 36, abnormality information is not transmitted to the information center 13. Therefore, it is possible to prevent the event where the information center 13 detects abnormality information when there is no failure. Besides, since the signal lines 35, 36 are provided prior to and independently of the provision of this failure information detection system, it is possible to detect that the bumper 32 is being repaired, while restraining the cost increase.

According to Examples 1 to 3, in the case where a component part (bumper 32) that relatively frequently is detached temporarily or becomes an object of replacement is provided with a portion component part (ultrasonic sensor 30) of a vehicle-mounted device, it is possible to prevent the vehicle-mounted device from detecting abnormality and transmitting abnormality information to the information center 13.

Incidentally, even in a type of failure information detection device 20 that does not transmit abnormality information to the information center 13 but stores information that abnormality has been detected by the abnormality detection means 33, the detection of abnormality of the vehicle-mounted device needs to be avoided in the case of repair of a component part since such detection makes it difficult to investigate the cause of the abnormality afterwards. Therefore, the failure information detection device 20 in the embodiments is able to prevent the transmission of abnormality information regarding the vehicle-mounted device in which a portion component part is disposed on a component part that is an object of repair, regardless of whether transmission of the abnormality information to the information center 13 is performed.

Besides, although in the foregoing embodiments, the obstacle detection ECU 22 has the abnormality detection means 33 and the abnormality detection prohibition means 34, one or both of the abnormality detection means 33 and the abnormality detection prohibition means 34 may be realized by another ECU. For example, if an ECU for abnormality detection, separate from the obstacle detection ECU 22, realizes the abnormality detection means 33 and the abnormality detection prohibition means 34, abnormality-related processes regarding combinations of portion component parts and component parts of various vehicle-mounted devices may be concentrated.

The foregoing relation between the portion component parts (the ultrasonic sensors 30) and the component part (the bumper 32) of the vehicle-mounted device (the clearance sonar device 25) also holds, for example, between a portion component part (a wheel speed sensor) and a component part (a tire wheel) of an ABS (Antilock Brake System) device (a vehicle-mounted device), between a portion component part (a voltage sensor for speed-change-ratio shift determination) and a component part (a transmission) of a power train (a vehicle-mounted device), etc. In the case of wheel speed sensors for four wheels, for example, abnormality is detected from individual differences of the four wheels even during a period during which individual differences of the four wheels are learned. Therefore, false detection of abnormality may be prevented not only in the case where a wheel is detached for repair, but generally at the time of repair of a wheel.

Furthermore, the foregoing combinations of portion component parts and component parts include various combinations of, for example, a portion component part (a G sensor) and a component part (the bumper 32) of an airbag device (vehicle-mounted device), a portion component part (a vibration sensor disposed within a door) and a component part (the door) of an antitheft device (a vehicle-mounted device), etc. The failure information detection device 20 of the foregoing embodiments may be applied to a portion component part and a component part of a vehicle-mounted device that have a relation as described above.

In Examples 1 to 3, due to the prohibition of the detection for abnormality or the prohibition of the transmission of abnormality information to the information center 1, abnormality information that is not based on a failure of a vehicle-mounted device is not transmitted to the information center 13. However, even if abnormality information not based on a failure of the vehicle-mounted device is transmitted to the information center 13, the aforementioned problem may still be avoided provided that it is discerned at the information center 13 that the abnormality information received does not mean a failure.

In conjunction with Example 4, a failure information detection system 100 in which the abnormality information not based on a failure of a vehicle-mounted device is discerned at the information center 13 will be described. Incidentally, in the following description, the abnormality information not based on a failure of a vehicle-mounted device (but due to repair of a component part) is referred to as "abnormality information FK", and the abnormality information due to a failure of a vehicle-mounted device is referred to as "abnormality information RL", and abnormality information without such distinction is referred to simply as "abnormality information".

Figure 11:
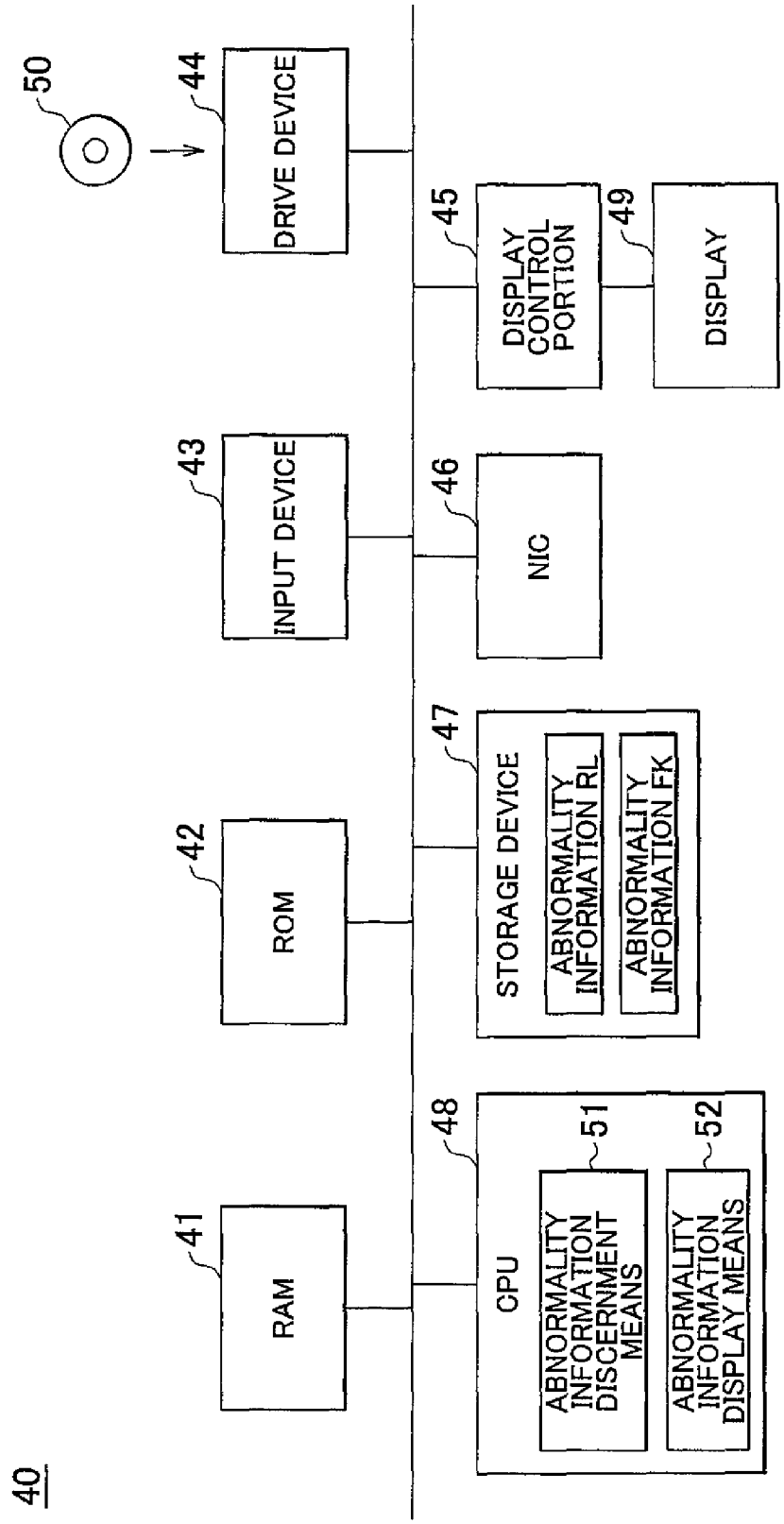
FIG. 11 is a block diagram of a server that an information center has in accordance with Example 4 in the embodiment of the invention.

FIG. 11 shows a block diagram of a server 40 that the information center 13 has. Incidentally, the construction of a failure information detection device 20 is the same as that shown in FIG. 3.

The server 40 includes a RAM 41 that serves as a work memory for executing programs, a ROM 42 storing programs and configuration files for activating the BIOS and the OS, an input device 43 for inputting various operation instructions from a user via a keyboard, a mouse, etc., a drive device 44 that writes data into a storage medium 50, such as a CD-RW or the like, or reads data from the storage medium 50, a display control portion 45 that forms a GUI (Graphical User Interface) on a display device, such as a display 49 or the like, according to requests from programs, an NIC (Network Interface Card) 46 that connects to a network 14 and executes a protocol process, such as TCP/IP or the like, a storage device 47 equipped with a non-volatile memory that stores programs and files, and a CPU 48 that executes various programs and generally controls the server 40. Incidentally, the server 40 in accordance with this embodiment may be regarded as a "reception portion" in the invention.

The CPU 48 realizes abnormality information discernment means 51 and abnormality information display means 52 by executing programs stored in the storage device 47. The abnormality information discernment means 51 determines whether the abnormality information received from the vehicle 11 is abnormality information FK or abnormality information RL. The abnormality information display means 52 displays the abnormality information FK and the abnormality information RL differently on the display 49. Incidentally, the abnormality information discernment means 51 in accordance with this embodiment may be regarded as an "abnormality information discernment portion" that is incorporated into the server of the invention, and the abnormality information display means 52 in accordance with this embodiment may be regarded as an "abnormality information display portion" in the invention.

The abnormality detection means 33 in Example 4 adds to the abnormality information FK non-attachment information showing that the bumper 32 is not attached to the vehicle 11, before the transmission of the abnormality information to the information center 13. Specifically, in Example 4, the abnormality detection prohibition means 34 does not prohibit the detection of abnormality, and does not prohibit the transmission of the abnormality information FK, RL, either.

The non-attachment information will be described. The non-attachment information is information regarding at least one of the detection of a break of line, the on/off state of the switch 76, and the simultaneous occurrences of abnormality in the systems of the signal lines 35, 36 described above in conjunction with Examples 1 to 3.

As stated above, the abnormality information is in the format of "chassis number—abnormality code—date and time of detection of abnormality—position information at the time of abnormality detection—associated information". Therefore, the information stored as the associated information, such as the presence/absence of detection of a break of line, the information about the on/off state of the switch 76, and the presence/absence of abnormality in the systems of the signal lines 35, 36, is the non-attachment information.

The abnormality information discernment means 51, upon receiving abnormality information, extracts non-attachment information from the abnormality information, and discerns whether the abnormality information is abnormality information FK or abnormality information RL, separately for each unit of abnormality information.

Therefore, the information center 13 may tally only the abnormality information RL and analyze the failed vehicle-mounted device and the causes of the failure, and may procure a spare part for the failed portion component part, if the failure has actually occurred, and may share the information with the automaker and make good use thereof for betterment.

Then, the abnormality information display means 52, for example, upon a request from a user (administrator) of the server 40, displays only the abnormality information RL, or only the abnormality information FK, or both the abnormality information FK and the abnormality information RL, on the display 49.

FIG. 12 shows an example of the abnormality information RL displayed on the display 49. The user may look at a list in which only the abnormality information RL is displayed despite the reception of both the abnormality information FK and the abnormality information RL, so that an appropriate measure against abnormality may be taken.

Figure 13:
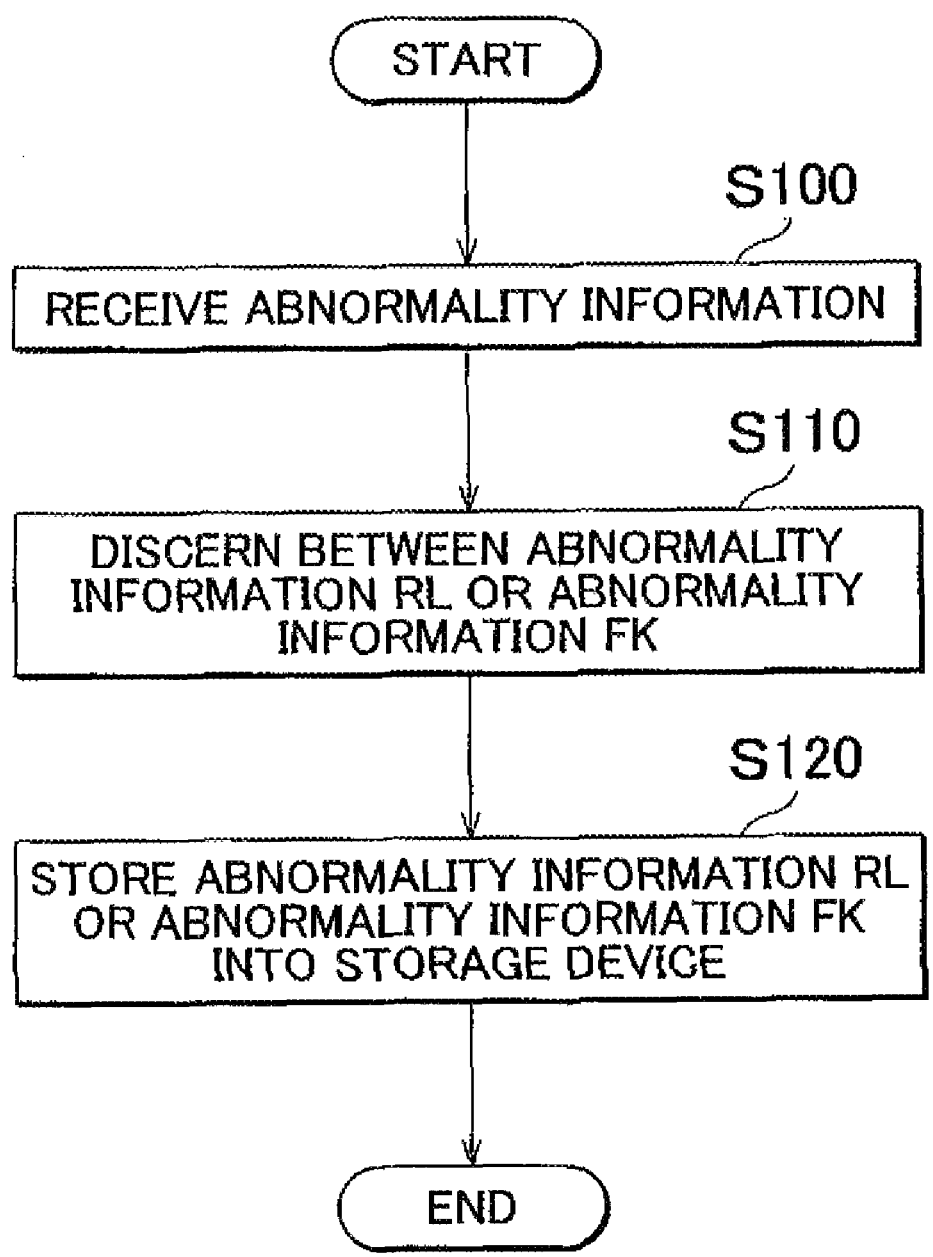
FIG. 13 is a flowchart showing a procedure of the server in accordance with Example 4 receiving abnormality information.

FIG. 13 is a flowchart showing a procedure of the server 40 receiving abnormality information. The process shown by the flowchart of FIG. 13 is repeatedly executed, for example, every time abnormality information is received.

When the server 40 receives abnormality information (S100), the abnormality information discernment means 51 determines whether the received abnormality information is abnormality information FK or abnormality information RL (S110).

Specifically, the abnormality information discernment means 51 extracts non-attachment information from the received abnormality information. Then, if the extracted non-attachment information includes information that indicates the detection of a break of line, the abnormality information discernment means 51 discerns the received abnormality information to be abnormality information FK (which is not based on a failure of a vehicle-mounted device). If the non-attachment information includes information that indicates the turning-on of the switch 76, the means 51 discerns the received abnormality information to be abnormality information FK. If the non-attachment information includes information that indicates that all the systems of the signal lines 35, 36 have abnormality, the means 51 discerns the received abnormality information to be abnormality information FK.

Then, the abnormality information discernment means 51 stores the abnormality information RL and the abnormality information FK into the storage device 47 (S120).

According to Example 4, in the case where a portion component part of a vehicle-mounted device is mounted on a component part that relatively frequently is detached temporarily or becomes an object of replacement, it may be accurately determined whether the abnormality information received by the information center 13 is based on a failure of the vehicle-mounted device even if abnormality information not based on such a failure is allowed to be transmitted to the information center 13. On the side of the vehicle 11, it suffices to simply transmit abnormality information to the information center 13, and there is no need to add a new construction. Therefore, the cost may be reduced in comparison with the case where the failure information detection device 20 of any one Examples 1 to 3 is mounted in each vehicle 11.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. A failure information detection device that detects abnormality of a vehicle-mounted device mounted in a vehicle and that transmits abnormality information to a server, characterized by, comprising:

attachment detection means for detecting whether a first component part has been attached to the vehicle;

abnormality detection means for detecting abnormality of a second component part that is disposed at the first component part; and abnormality detection prohibition means for prohibiting detection of abnormality or prohibiting transmission of the abnormality information if the attachment detection means detects that the first component part has not been attached to the vehicle, wherein:

the attachment detection means has a connecting line that electrically connects the first component part and the vehicle, and break-of-line detection means for detecting a break of the connecting line; and the attachment detection means detects that the first component part has not been attached to the vehicle, if a break of the connecting line is detected.

2. The failure information detection device according to claim 1, characterized in that the first component part is a bumper, and the second component part is a sensor that monitors surroundings.

3. A failure information detection device that detects abnormality of a vehicle-mounted device mounted in a vehicle and that transmits abnormality information to a server, characterized by comprising:

attachment detection means for detecting whether a first component part has been attached to the vehicle;

abnormality detection means for detecting abnormality of a second component part that is disposed at the first component part; and abnormality detection prohibition means for prohibiting detection of abnormality or prohibiting transmission of the abnormality information if the attachment detection means detects that the first component part has not been attached to the vehicle, wherein the attachment detection means has a switch that turns to an on-state or an off-state when the first component part is attached to the vehicle, and the attachment detection means detects that the first component part has not been attached to the vehicle, if the switch is in an on-state or an off-state.

4. A failure information detection device that detects abnormality of a vehicle-mounted device mounted in a vehicle that transmits abnormality information to a server, characterized by comprising:

attachment detection means for detecting whether a first component part has been attached to the vehicle;

abnormality detection means for detecting abnormality of a second component part that is disposed at the first component part; and abnormality detection prohibition means for prohibiting detection of abnormality or prohibiting transmission of the abnormality information if the attachment detection means detects that the first component part has not been attached to the vehicle, wherein the attachment detection means detects that the first component part has not been attached to the vehicle, if abnormality is detected in each of a plurality of signal lines of the vehicle-mounted device, the plurality of signal lines connecting the vehicle and the second component part.

5. A failure information detection system in which a failure information detection device detects abnormality of a vehicle-mounted device mounted in a vehicle and transmits abnormality information to a server, characterized in that the failure information detection device comprises:

attachment detection means for detecting whether a first component part has been attached to the vehicle;

abnormality detection means for detecting abnormality of a second component part that is disposed at the first component part; and abnormality detection prohibition means for prohibiting detection of abnormality or prohibiting transmission of the abnormality information if the attachment detection means detects that the first component part has not been attached to the vehicle; and the attachment detection means detects that the first component part has not been attached to the vehicle, if abnormality is detected in each of a plurality of signal lines of the vehicle-mounted device, the plurality of signal lines connecting the vehicle and the second component part.

6. A failure information detection system in which a failure information detection device detects abnormality of a vehicle-mounted device mounted in a vehicle and transmits abnormality of a vehicle-mounted device mounted in a vehicle and transmits abnormality information to a server, characterized in that the failure information detection device comprises:

attachment detection means for detecting whether a first component part has been attached to the vehicle;

abnormality detection means for detecting abnormality of a second component part that is disposed at the first component part; and a transmission means for transmitting to the server the abnormality information and non- attachment information that indicates that the first component part has not been attached to the vehicle, if the attachment detection means detects that the first component part has not been attached to the vehicle;

the attachment detection means detects that the first component part has not been attached to the vehicle, if abnormality is detected in each of a plurality of signal lines of the vehicle-mounted device, the plurality of signal lines connecting the vehicle and the second component part; and the server comprises:

a reception means for receiving the abnormality information and the non-attachment information; and abnormality information discernment means for discerning that the abnormality information is not based on a failure of the vehicle-mounted device, if it is detected based on the non-attachment information that the first component part has not been attached.

7. A failure information detection method for a failure information detection device mounted in a vehicle that detects abnormality of a vehicle-mounted device and that transmits abnormality information to a server, characterized by comprising:

a step in which attachment detection means detects whether a first component part has been attached to the vehicle;

a step in which abnormality detection means detects abnormality of a second component part that is disposed at the first component part; and a step in which abnormality detection prohibition means prohibits detection of abnormality or prohibits transmission of the abnormality information if the attachment detection means detects that the first component part has not been attached to the vehicle, wherein:

the attachment detection means detects that the first component part has not been attached to the vehicle, if abnormality is detected in each of a plurality of signal lines of the vehicle-mounted device, the plurality of signal lines connecting the vehicle and the second component part.

8. The failure information detection device according to claim 3, characterized in that the first component part is a bumper, and the second component part is a sensor that monitors surroundings.

9. The failure information detection device according to claim 4, characterized in that the first component part is a bumper, and the second component part is a sensor that monitors surroundings.

10. A server that receives abnormality information regarding a vehicle-mounted device from a failure information detection device that is mounted in a vehicle, the server characterized in that the server receives the abnormality information from the failure information detection device that comprises:

attachment detection means for detecting whether or not a first component part has been attached to the vehicle;

abnormality detection means for detecting abnormality of a second component part that is disposed at the first component part;

transmission means for transmitting the abnormality information that indicates abnormality; and abnormality detection prohibition means for prohibiting detection of abnormality or prohibiting transmission of the abnormality information if the attachment detection means detects that the first component part has not been attached to the vehicle, wherein the attachment detection means detects that the first component part has not been attached to the vehicle, if abnormality is detected in each of a plurality of signal lines of the vehicle-mounted device, the plurality of signal lines connecting the vehicle and the second component part.

11. The server according to claim 10 characterized by further comprising abnormality information display means for displaying on a display device at least one of the abnormality information received by the reception means, the abnormality information that the abnormality information discernment means discerns as being based on the failure of the vehicle-mounted device, and the abnormality information that the abnormality information discernment means does not discern as being based on the failure of the vehicle-mounted device.

12. A server that receives abnormality information regarding a vehicle-mounted device from a failure information detection device that is mounted in a vehicle, the server characterized by comprising:

reception means for receiving the abnormality information and non-attachment information from the failure information detection device, wherein the failure information detection device comprises:

attachment detection means for detecting, whether or not a first component part has been attached to the vehicle;

abnormality detection means for detecting abnormality of a second component part that is disposed at the first component part; and transmission means for transmitting to the server the abnormality information and non-attachment information that indicates that the first component part has not been attached to the vehicle, if the attachment detection means detects that the first component part has not been attached to the vehicle, and the attachment detection means detects that the first component part has not been attached to the vehicle, if abnormality is detected in each of a plurality of signal lines of the vehicle-mounted device, the plurality of signal lines connecting the vehicle and the second component part; and abnormality information discernment means for discerning that the abnormality information is not based on a failure of the vehicle-mounted device, if it is detected based on the non-attachment information that the first component part has not been attached.

13. The server according to claim 12 characterized by further comprising abnormality information display means for displaying on a display device at least one of the abnormality information received by the reception means, the abnormality information that the abnormality information discernment means discerns as being based on the failure of the vehicle-mounted device, and the abnormality information that the abnormality information discernment means does not discern as being based on the failure of the vehicle-mounted device.

* * * * *